Aug. 18, 1953

G. S. POWERS 2,648,944

CANE GATHERING DEVICE

Filed April 26, 1950

INVENTOR
George S. Powers,

BY

ATTORNEYS.

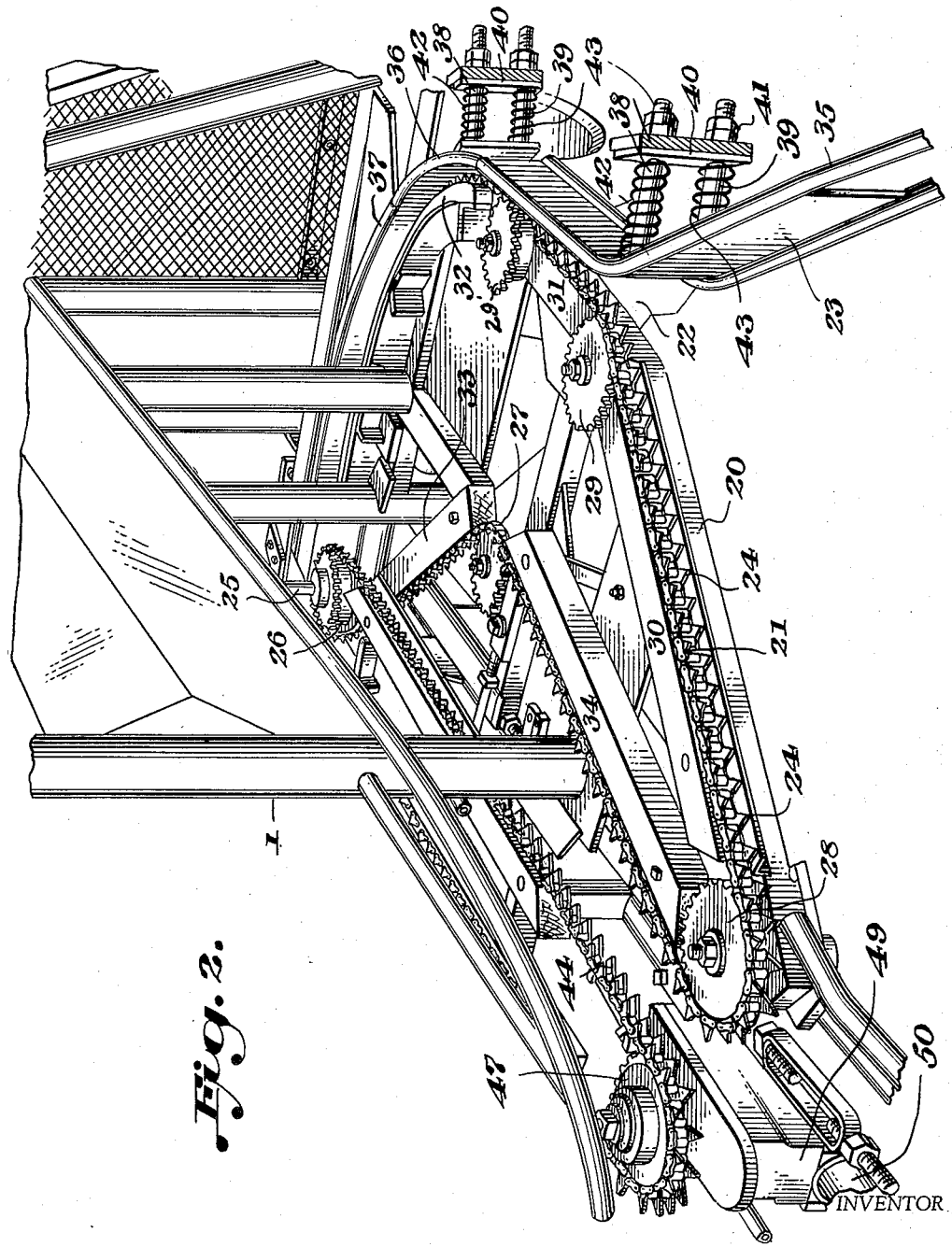

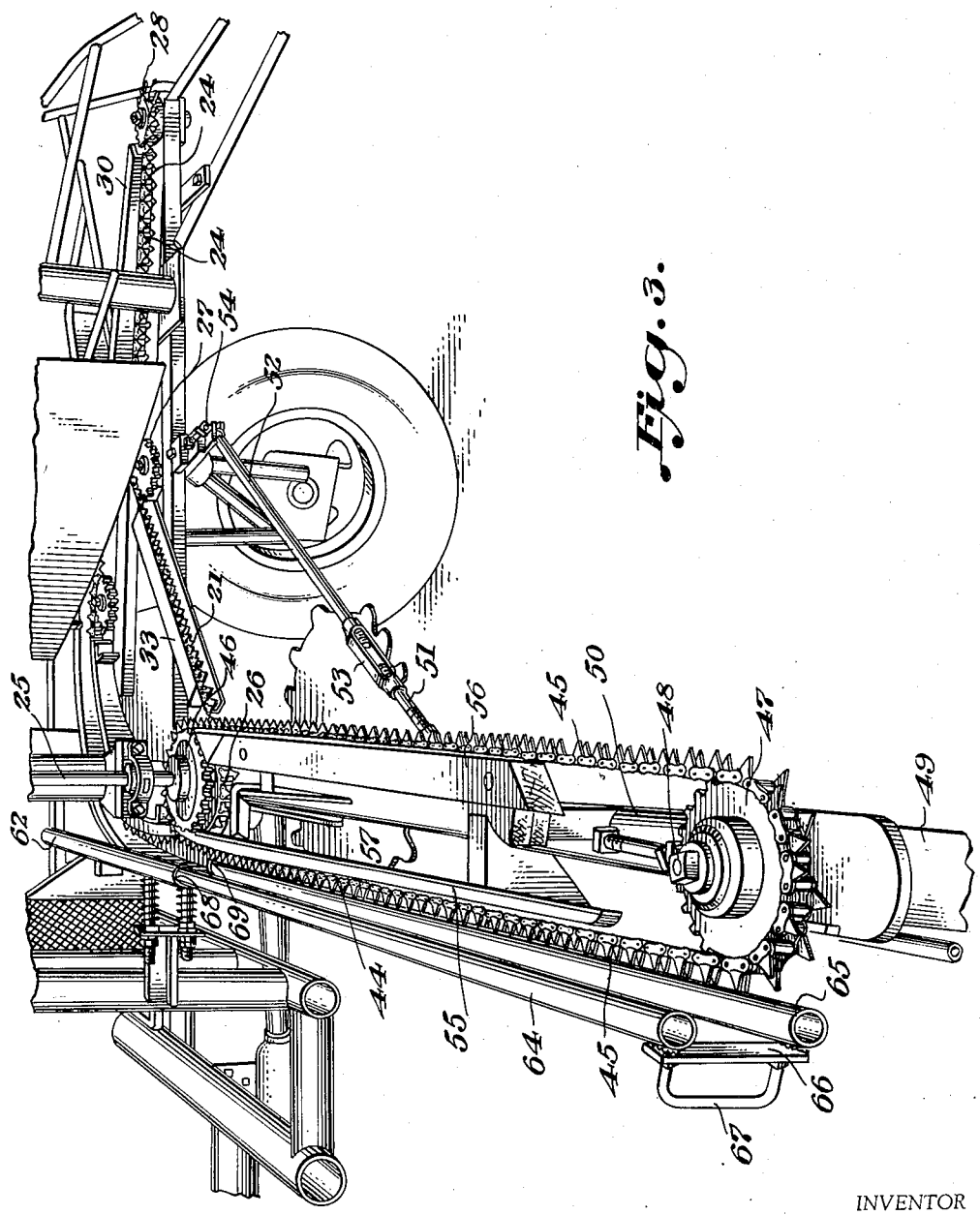

Aug. 18, 1953        G. S. POWERS                 2,648,944
                  CANE GATHERING DEVICE
Filed April 26, 1950                    4 Sheets-Sheet 4
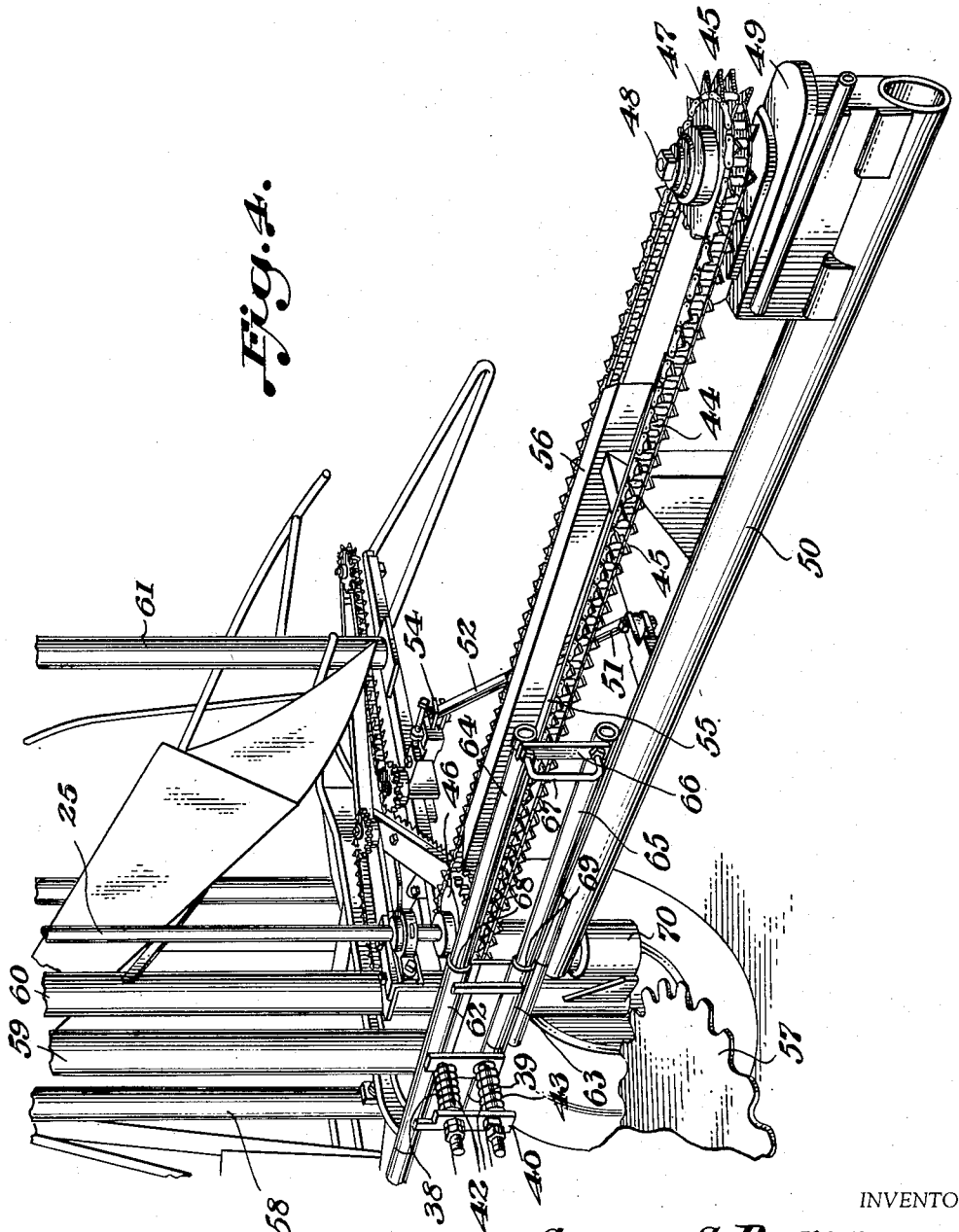
INVENTOR
George S. Powers,
BY Mason & Mason
ATTORNEYS Patented Aug. 18, 1953

2,648,944

UNITED STATES PATENT OFFICE 2,648,944

CANE GATHERING DEVICE

George S. Powers, New Roads, La.

Application April 26, 1950, Serial No. 158,180

8 Claims. (Cl. 56—119)

This invention relates to a machine for harvesting sugar cane and is a development of the patent granted me for Cane Harvesting Machine No. 2,458,299 patented January 4, 1949.

One of the principal objects of the invention is to provide a sugar cane cutting machine which travels over the ground and cuts and tops the cane from the standing rows of sugar cane and which also raises all twisted and fallen cane from the ground and holds such cane in vertical position until the carrier chains or other conveyor means can hold and feed the cane into the machine. The mechanics for raising and holding fallen cane may be made as an attachment to existing cane cutting machines.

Another object of the invention is to provide a structure made in accordance with the aforementioned device which raises the fallen cane, that is provided with means that closely follows within a plurality of trenches between rows and which gets under the fallen and twisted cane whereby it is raised. As the machine moves forward this cane, which is raised, is caught by specially constructed conveyor means which causes it to assume a vertical position, after which it is fed to the cutting and topping means.

An additional object of the invention is to provide a cane carrier that will convey the cane, after it has been severed from the row and topped, to outside rows and across what is commonly known as the heap row. When the machine returns on the opposite side or in the adjoining row, it again piles the cane on the same heap row. By the improved construction, the cane is cut and piled into one heap row from four rows of cane as cut from such rows.

Additional objects will appear hereinafter throughout the specification.

In the drawings:

Figure 2 is a perspective view of the cane conveyor means for conveying cane to the cutters and of the heap row conveyor in folded position for road or head travel.

Figure 3 is a perspective view of the device taken from the side with the heap row conveyor being in operative position, and Figure 4 is a perspective view similar to Figure 3 but taken from a slightly different position.

Figure 1:
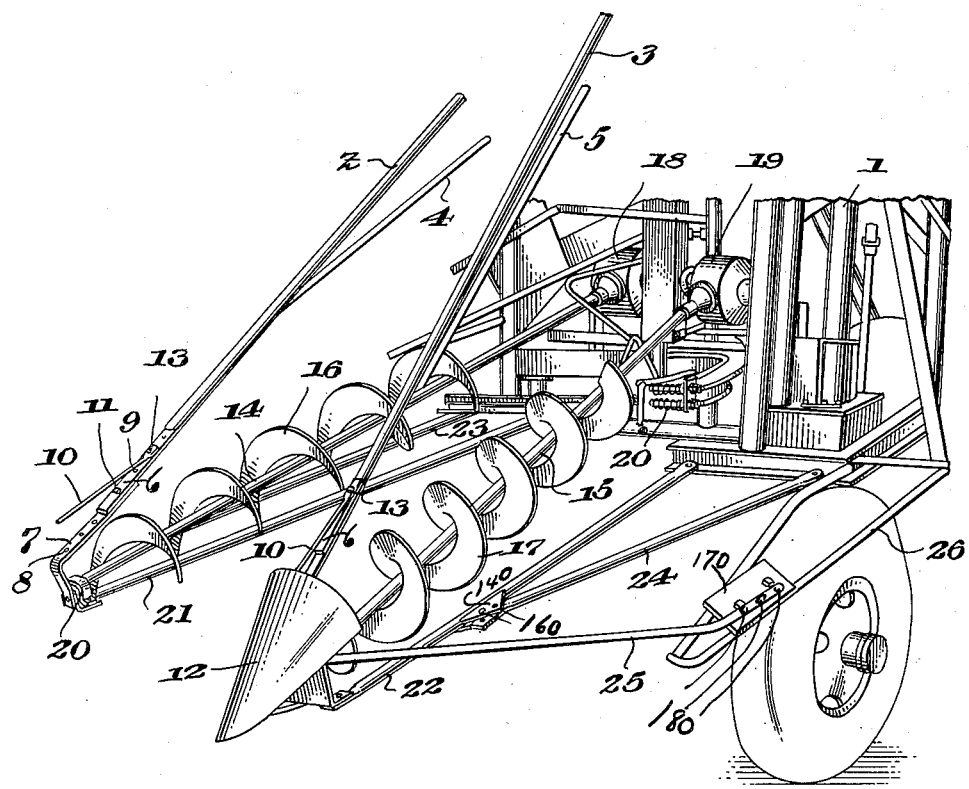
Figure 1 is a perspective view of the front of the machine showing the cane lifter and straightener, with the left cap removed.

The present improvements are directed primarily to perfect the construction and operation of the cane cutter shown in my patent aforesaid, but is also well adapted to other machines for cutting sugar cane in the field.

Referring generally to the structures shown in the several figures, the structure shown in Figure 1 is principally used as an attachment, and when used with my patented cane harvesting machine, the device is attached only when needed, such as following a storm cane stalks are to be found lying across the ground haphazardly instead of the usual vertical position. Therefore, it is applied to existing machines.

The structure shown in Figure 2 is for feeding the cane into the cutters and toward the heap row conveying mechanism shown in Figures 3 and 4. This structure as shown in Figure 2 may take the place of one or both of the conveyors such as indicated by numeral 53 in the patent. Other similar cane cutting machines have cane feeding conveyors somewhat similar to that shown in my patent. The piling conveyor for making heap rows of the cane is shown in Figures 3 and 4. This structure is to take the place of and be substituted for the conveyor carried indicated generally by numeral 28 in my patent. Other cane cutting machines have conveyor carriers at the end or to one side of the cane cutting machine, and the device shown in Figures 3 and 4 may be substituted for such conveyor carriers.

Referring now to the structure shown in Figure 1, numeral I indicates generally the frame of a cane harvesting machine, the same as or similar to that shown in my patent. Such a cane cutter may be provided with one or more cutters and means, or drivers, the cutters and conveyors as shown in the patent. Extending from the top of such framework are supporting arms 2, 3 having brace rods 4, 5, respectively. There is a shield or cap 12 at the forward end of the attachment, each supported by arm 2 or 3, but for the sake of clarity the left cap has been removed, as seen in Figure 1.

The lower end of each arm has a flattened portion 6 to which is attached an angle member 7, each of which is provided with holes 8 and 9. One or more bolts 11 adjustably connect these parts to each other to permit vertical adjustment of the forward ends of the cane lifting devices whose forward ends are each provided with the cap 12 that may be detachably attached to the angle member 7 by means of the rod 10 that is attached to flattened portion 6 by a bolt 13 that engages through one of the holes 9.

Shafts 14, 15 support screws or worms 16, 17, the shafts being suitably rotated by offtake drive mechanism such as the gear boxes 18, 19 which are similar in construction to the gear boxes 95 shown in my patent. Any other drive means for these shafts may be used in place of the gear boxes shown. The forward end of each shaft is held in a bearing 20, only one of which is shown, both forward bearings being of identical construction.

Adjustable hangers 21, 22, 23, 24, 25 and 26 are provided, whereby each unit may be adjusted in a substantially horizontal plane toward and away from its companion unit, so that each cap may be caused to travel down the trough of a row of standing cane. The horizontal adjustment is for the purpose of adjusting the caps according to the distance between parallel troughs. Each shield or cap may be adjusted in a vertical direction as when traversing a road, by means of holes 8 and 9. Each hanger 24 may be adjusted in holes 160 in plate 140 fixed on plate 22. Each hanger 25 is adjusted by moving its end so as to engage one of the holes 180 in plate 170 fixed to hanger 126. Other means such as hydraulic mechanism (not shown) may be substituted to provide lateral adjustment.

When wind storms occur after the rainy season in the cane belt, much of the cane is found to be lying on the ground, the stalks being crossed up across the various rows. Under this condition much of the cane cannot be harvested by cane harvesters of the type now being used. This is due to the fact that the cane stalks cannot be straightened and carried by the pick-up chains where it can be properly topped and severed from the ground. However, with the present device, which may be easily attached to existing machines within about 30 minutes, all twisted and fallen cane is raised from the ground and held in a perpendicular position until the carrier-chain mechanism shown generally at 20 takes hold of the now upright stalks of cane.

As the machine travels over the ground, the cap of each unit is adjusted so that each cap "runs" in a trench or gulley of the cane rows. Any cane that has fallen into or across a cane row is raised by the cap which passes under it to such an angle that when it slips off the cap, as the machine moves forward, it is caught by the turning worm or screw 16 or 17 and is raised to a perpendicular position. As the worm rotates continuously, it holds the cane in a perpendicular position until it is engaged by the carrier chain unit 20, shown in greater detail in Figure 2.

One such conveyor mechanism, suitable for co-operating with the pair of units shown in Figure 1, is the conveyor mechanism shown in Figure 2. Here the throat 22 and stick chain 21 with its guard 23 are located immediately in the rear of the worms 16 and 17.

When facing the front of the machine the left worm turns counter-clockwise and the right worm clockwise. It will be noted that the worms are slightly inclined upwardly from the front to the rear thereof.

It will be understood that a pair of worms (not shown) positioned above the worms shown with drive means therefor may be provided in order to help additionally in straightening out the top and holding in vertical position, cane stalks before they reach the topping knife.

Sticker-chain 21 is provided with spurs or stickers 24.

The chain 21 is driven by a shaft 25 through a sprocket 26 mounted thereon, said shaft being driven by a power take-off. Other sprocket wheels 27, 28, 29 and 29' are provided to suitably guide the chain. Inside track members 30, 31, 32, 33 and 34 also assist in guiding the chain 21. These track members are preferably of channel iron construction, or they may be constructed of wood and provided with a groove on one side so as to prevent upward or downward movement of the chain as it is guided by the guide members.

During the time the sugar cane is engaged by the sticker chain 21, the cane from the ground, is topped and is carried around to the point beyond the shaft 25 where it is delivered to the heap row conveyor. While engaged by the spurs 24 of this chain, the cane stalks also engage the guide 23.

This guide is made of a plurality of sections 35, 36 and 37. Although three sections are shown, any number of sections may be provided. Each section is supported by pairs of bolts 38 and 39 which slide in the plate 40. The ends of bolts may be provided with one or more nuts 41 which screw-threadedly engage the bolts as seen in Figure 2. It will be understood that the plate 40 is rigidly fastened to a suitable part of the frame 1.

The ends of the bolts opposite the screw-threaded ends are rigidly fastened to one of the plate sections. Springs 42, 43 surround the bolts and as these springs are under compression they continuously force each section toward the sticker chain.

At approximately the time that the cane is securely held by the sticker chain, that is, when it enters throat 22, the cane is topped by the top knife, and immediately after topping the cane is severed from the soil by the bottom knife. The can is carried by the sticker chain to the side of the machine where it is picked up by the heap roll conveyor.

It will be noted that as the cane enters the throat of the machine, it is pressed by the sticker chain against the guide sections, which latter are resiliently pressed toward the chain. The purpose of the coil springs 42 and 43 is to permit the opening and closing of the guide sections to a greater or lesser degree according to the amount of cane which is fed into the throat 22. When the cane is thin, the sections will open only a very slight amount but when the cane is heavy, that is when there are a large number of stalks that are fed into the throat at the same time, the springs permit the guide sections to move away from the chain to a limited degree. However, the sections always maintain a sufficient tension to permit the sticker chain to securely hold the cane and to carry it to the points where it is picked up by the heap row conveyor now to be described.

Referring to Figures 3 and 4, after the topped and cut cane leaves the chain 21, it is picked up by the heap row chain 44 which latter is provided with spurs 45. This chain is driven by the sprocket wheel 46 which drives the chain and the idle sprocket wheel 47. Said sprocket wheel 46 is mounted upon the shaft 25 which drives the conveying chain 21.

Sprocket wheel 47 is mounted on shaft 48 that rotates in head 49, which is mounted on swinging arm 50. This arm with sprocket 47 and chain 44 is adapted to assume the position shown in Figures 3 and 4 when depositing the cut cane in heap rows on a field, or the arm may be swung forwardly and locked by a suitable latch (not shown) to the position shown in Figure 2. This latter position is used when traveling on a road or, in fact, at any time when the heap row conveyor is not in use.

The swinging arm 50 is held rigidly in the position shown in Figures 3 and 4 by means of link members 51 and 52 which are connected to each other by turn-buckle 53, and may be detached by unscrewing the turn-buckle. Arm 51 is pivotally connected to swinging arm 50 while arm 52 is pivotally connected to a bracket 54 on the frame work 1. Also mounted on the swinging arm are chain guides 55 and 56.

As seen in Figures 3 and 4, the lower knife is indicated at 57. The upper or top knife is not shown, but these knives may be constructed similarly to knives 67 and 68 as in my patent noted above, and flag removing brushes, not shown, as shown in the patent, may also be provided. Numerals 58, 59, 60 and 61 are vertical supports forming a part of the framework.

Attached to the framework are horizontally mounted housing members 62 and 63. These housing members are shown as being circular in a cross-section but they may be secured oblong, or otherwise multi-sided in the cross-section.

Slideably mounted in the horizontally mounted housing members, which housing members extend transversely of the machine, are the adjustable guide members 64 and 65. The ends of these last named members are rigidly connected to each other by a bar 66 having a handle 67.

As seen in Figure 4, the adjustable guide members have been pushed partially out, but in Figure 3 the adjustable guide members have been slid to the limits of which they are slideable, and in this position the ends of these adjustable guide members are located at each end of the run of the chain 44, and adjacent to the sprocket wheel 47. The adjustable housing members may be slid all the way back in the housing members to a position where they extend only an inch or two beyond the ends 68 and 69 of the housing members when the machine is traveling along a road.

The entire assembly, which includes the sprocket chain 44, driven sprocket wheel 47, head 49 and swinging arm 50, may be swung about a pivot which is the center of shaft 25. This is because the assembly is entirely supported by the bearing 70 located below the shaft 25. The guide members 64 and 65 do not swing but have only adjustable sliding movements.

In order to advance the machine over a road or onto the field prior to cutting the cane, it is only necessary to insure that the adjustable guide members have been slid into the housing members as far as possible, and that the assembly (including the chain 44, the swinging arm 50, and the members mounted on it) is swung to the position shown in Figure 2. The machine will then be easily maneuverable to its position of use. With the members shown in Figure 3, the cane will be carried to its furthest limit before being deposited, but when the adjustable guide members 64, 65, have been moved to the position shown in Figure 4, the cane will be deposited at the ends of the adjustable guide members, namely a little less than half way of the distance from the sprocket wheel 46 to the sprocket wheel 47. This is due to the telescoping portion of the guide composed of guide members 64 and 65, and when the end of these guide members is reached the cane drops on the ground. The chain 44 with its spurs 45 progressively moves the cane along a path between the guide members and the chain.

When the end of the guide members is reached, this path no longer exists and the cane falls off of the chain onto the ground. The handle 67 is grasped in order to adjust the guide members and when the limit of these members is reached, the cane drops and the cut row of cane becomes corded. Referring again to Figure 4, the adjustment of the guide members will permit the dropping of the cane on the first row, that is, the row immediately adjacent to the machine as it travels from the ground and after cording two rows on one heap rower, the handle 67 is grasped to adjust the guide members to the position shown in Figure 3. In this position two additional rows may be corded on the first two rows, as the machine proceeds along rows which are further removed from its first position.

The machine may be self-propelled or it may be placed at the front of, or the rear of, a tractor.

An improved feature of the invention is the support of the swinging arm 50, members supported thereby, and the adjustable guide members without resorting to any braces or arches to support these members, either from above or below the machine. The only additional parts used are the links 51 and 52 and turn-buckle 53 which rigidly fixes the swinging arm and the members supported by it, in its working position.

It will be noted that the structure shown in Figure 1 and in Figures 3 and 4 may be readily applied to the device of my patent, while the structure shown in Figure 2 may be substituted for the sprocket chain 53 shown in my patent.

*Operation*

The machine is operated similarly to the operation of the machine of my patent. However, should there be a lot of cane on the ground due to storm damage, the attachment shown in Figure 1 may be used so that the cane is picked up and held in a horizontal position before being fed into throat 22. After the cane is cut and topped, as held by the chain 21 and guide 23, it is fed to the heap row conveyor shown in Figures 4 and 5. Four rows of cut cane may be deposited in a single heap row due to the adjustment of the heap row guide members 64 and 65.

The heap row conveyor, as stated heretofore, may be substituted for the conveyor carrier 28 of my patent.

I desire to be limited only to the extent set forth in the appended claims.

I claim:

1. In combination with a mobile vehicle, a cane pick-up conveyor means adjacent a forward portion of said vehicle extending substantially fore and aft of said vehicle, a cane piling conveyor forming a continuation of said pick-up conveyor means and extending transversely outwardly of said vehicle, a substantially continuous primary guide means extending along a side of said pick-up conveyor means, and secondary guide means extending outwardly along the rear side of said piling conveyor, said secondary guide means being adjustable whereby the piling point may be determined.

2. In combination with a mobile vehicle, a cane pick-up conveyor means adjacent a forward portion of said vehicle extending substantially longitudinally of said vehicle, a cane piling conveyor forming a continuation of said pick-up conveyor means and extending transversely outwardly of said vehicle, a substantially continuous primary guide means extending along a side of said pick-up conveyor means, and secondary guide means extending outwardly along the rear side of said piling conveyor, said secondary guide means being adjustable whereby the piling point may be determined.

3. In combination with a mobile vehicle, a cane pick-up conveyor means adjacent a forward portion of said vehicle extending substantially longitudinally of said vehicle, a cane piling conveyor forming a continuation of said pick-up conveyor means and extending transversely outwardly of said vehicle, a substantially continuous primary guide means extending along a side of said pick-up conveyor means, and secondary guide means extending outwardly along the rear side of said piling conveyor, said secondary guide means being adjustable whereby the piling point may be determined, said piling conveyor having pivot means for swinging the same about a vertical axis.

4. In combination with a mobile vehicle, a cane pick-up conveyor means adjacent a forward portion of said vehicle extending substantially longitudinally of said vehicle, a cane piling conveyor forming a continuation of said pick-up conveyor means and extending transversely outwardly of said vehicle, a substantially continuous primary guide means extending along a side of said pick-up conveyor means, secondary guide means extending outwardly along the rear side of said piling conveyor, said secondary guide means being adjustable whereby the piling point may be determined, said piling conveyor having pivot means for swinging the same about a vertical axis, and bracing means for holding said piling conveyor in operative position transverse to the longitudinal axis of the vehicle.

5. In combination with a mobile vehicle, a cane pick-up conveyor means adjacent a forward portion of said vehicle extending substantially fore and aft of said vehicle, a cane piling conveyor forming a continuation of said pick-up conveyor means and extending transversely outwardly of said vehicle, a substantially continuous primary guide means extending along a side of said pick-up conveyor means, and secondary guide means extending outwardly along the rear side of said piling conveyor, means for adjusting said secondary guide means along the rear side of said piling conveyor including telescopic members whereby the piling point may be determined.

6. In combination with a mobile vehicle, a cane pick-up conveyor means adjacent a forward portion of said vehicle extending substantially longitudinally of said vehicle, a cane piling conveyor forming a continuation of said pick-up conveyor means and extending transversely outwardly of said vehicle, a substantially continuous primary guide means extending along a side of said pick-up conveyor means, and secondary guide means extending outwardly along the rear side of said piling conveyor, means for adjusting said secondary guide means along the rear side of said piling conveyor including telescopic members whereby the piling point may be determined.

7. In combination with a mobile vehicle, a cane pick-up conveyor means adjacent a forward portion of said vehicle and extending fore and aft of said vehicle, a cane piling conveyor forming a continuation of said pick-up conveyor means and extending substantially transversely outwardly of said vehicle, a substantially continuous primary guide means extending along a side of said pick-up conveyor means, and secondary guide means extending outwardly along the rear side of said piling conveyor, said secondary guide means having means for adjusting the length thereof whereby the piling point may be determined, said last-named means including adjustable housing means rigidly mounted on said vehicle and adjustable guide members slidably adjustable within said housing means.

8. In combination with a mobile vehicle, a cane pick-up conveyor means adjacent a forward portion of said vehicle and extending fore and aft of said vehicle, a cane piling conveyor forming a continuation of said pick-up conveyor means and extending substantially transversely outwardly of said vehicle, a substantially continuous primary guide means extending along a side of said pick-up conveyor means, and secondary guide means extending outwardly along the rear side of said piling conveyor, said secondary guide means having means for adjusting the length thereof whereby the piling point may be determined, said last-named means including adjustable housing means rigidly mounted on said vehicle and adjustable guide members slidably adjustable within said housing means, said members being vertically spaced from each other.

GEORGE S. POWERS.

References Cited in the file of this patent

UNITED STATES PATENTS

| Number | Name | Date |
|---|---|---|
| 592,252 | Patterson | Oct. 26, 1897 |
| 1,838,498 | Pospishil | Dec. 29, 1931 |
| 1,855,109 | Justman | Apr. 19, 1932 |
| 2,297,296 | Flintjer | Sept. 29, 1942 |
| 2,427,313 | Thomson | Sept. 9, 1947 |
| 2,435,334 | Wurtele | Feb. 3, 1948 |
| 2,480,777 | Schwartz | Aug. 30, 1949 |